United States Patent [19]

Hao et al.

[11] Patent Number: 4,569,016
[45] Date of Patent: Feb. 4, 1986

[54] MECHANISM FOR IMPLEMENTING ONE MACHINE CYCLE EXECUTABLE MASK AND ROTATE INSTRUCTIONS IN A PRIMITIVE INSTRUCTION SET COMPUTING SYSTEM

[75] Inventors: Hsieh T. Hao, Chappaqua; Peter W. Markstein, Yorktown Heights; George Radin, Piermont, all of N.Y.

[73] Assignee: International Business Machines Corporation, Armonk, N.Y.

[21] Appl. No.: 509,836

[22] Filed: Jun. 30, 1983

[51] Int. Cl.$^4$ .............................................. G06F 9/00
[52] U.S. Cl. ................................................... 364/200
[58] Field of Search ... 364/200 MS File, 900 MS File

[56] References Cited

U.S. PATENT DOCUMENTS

| | | | |
|---|---|---|---|
| 4,224,682 | 9/1980 | Kindell et al. | 364/200 |
| 4,240,144 | 12/1980 | Kindell | 364/200 |
| 4,246,644 | 1/1981 | Flynn et al. | 364/900 |
| 4,276,596 | 6/1981 | Flynn et al. | 364/200 |
| 4,467,444 | 8/1984 | Harmon et al. | 364/900 |

Primary Examiner—Gareth D. Shaw
Assistant Examiner—John G. Mills
Attorney, Agent, or Firm—Roy R. Schlemmer

[57] ABSTRACT

A mechanism for performing fast and efficient full shift, merge, insert and bit alignment functions within one operating machine cycle of a host primitive instructions set computing system. In general, the circuitry performs a ring shift under control of a mask. The circuitry further combines essentially parallel rotate and mask and merge functions all executable in one machine cycle. The circuitry further allows the provision of powerful bit, digit, and bit rotate with mask instructions which are particularly useful primitive operations for decimal packing and unpacking functions as well as for implementing floating point preshifting and normalization functions.

10 Claims, 5 Drawing Figures

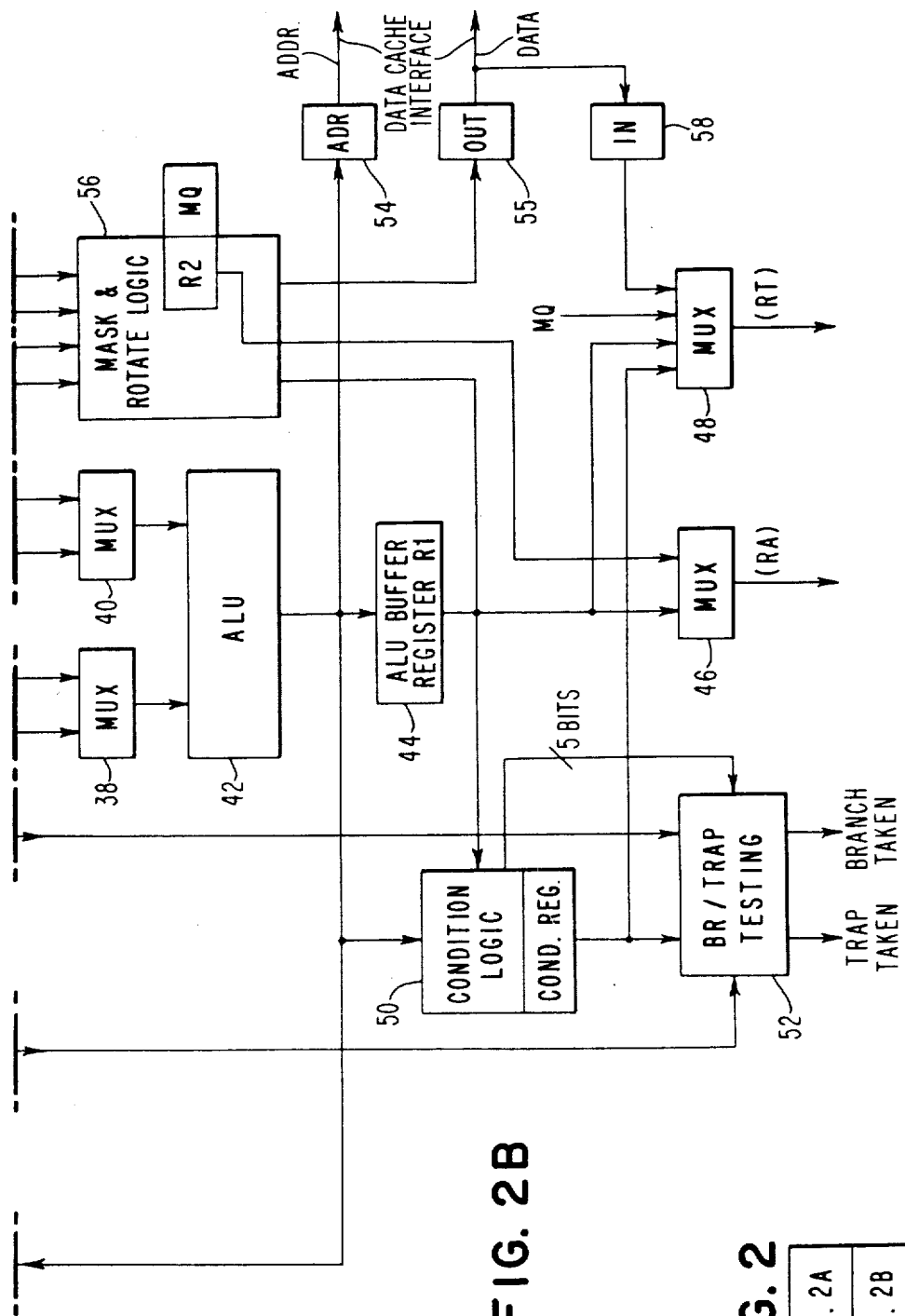

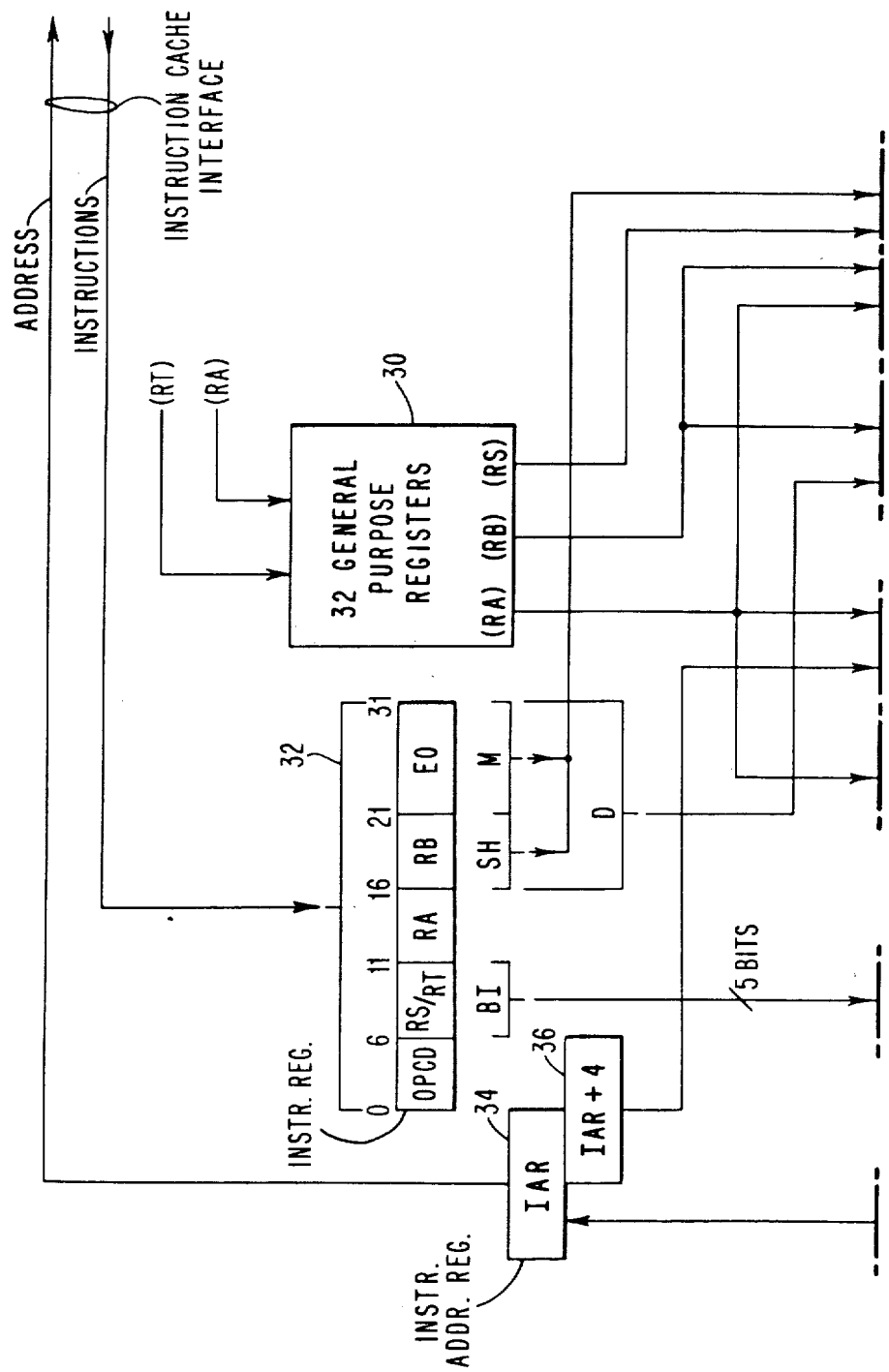

MECHANISM FOR IMPLEMENTING ONE MACHINE CYCLE EXECUTABLE MASK AND ROTATE INSTRUCTIONS IN A PRIMITIVE INSTRUCTION SET COMPUTING SYSTEM

BACKGROUND OF THE INVENTION

Field of the Invention

The present invention has particular utility in a reduced instruction set computer architecture, two examples of which are described in considerable detail, as to their basic architectural features as well as overall design consideration, in the two articles (1) "The 801 Minicomputer," by George Radin and (2) "RISC I: A reduced Instruction Set VLSI Computer," by Patterson and Sequin. The complete bibliographic data for these two articles is set forth more fully in the subsequent Prior Art section.

Current developments in the semiconductor industry indicate that very large-scale integration (VLSI) affords microprocessor designers two conflicting approaches to designing future systems. The first is that they can continue the current trend, where VLSI is used to build increasingly complex microprocessors, where greater complexity is exhibited as more hardware to do functions previously done by software alone. Alternatively, they can take the opposite approach and build simpler, very fast processors, where more functions are done by software. This second approach is exemplified in the two above-referenced articles.

Greater complexity lets designers use ever-cheaper VLSI circuits in place of increasingly expensive and processor time consuming software. What's more, the takeover of many software functions by hardware is said to help programmers develop high-level language (HLL) programs that are shorter, more efficient, and easier to write, compile and debug. More complex systems would, in theory, reduce the high cost of developing software and thus reduce the total life-cycle cost of a system.

Thus, system designers following the first approach, increase the complexity of architectures commensurate with the increasing potential of implementation technologies, as exemplified by the complex successors of simpler machines. Compare, for example, VAX 11 to PDP-11, IBM System/38 to IBM System/3, and Intel APX-432 to 8086. The consequences of this complexity are increased design time, an increased potential for design errors and inconsistent implementations. This class of computers has been referred to in the literature as complex instruction set computing (CISC) systems.

As indicated previously in the above referenced article "The 801 Minicomputer" by G. Radin a coinventor of the present invention, a unique approach to overall CPU architecture has been realized following the second of the two previously mentioned approaches to architecture design, i.e., a reduced instruction set computer. The heart of such a system architecture is its CPU. Most of the aspects of this system are designed to make available to the user the fundamental power of the underlying CPU. The overall organization is somewhat different from more conventional CPUs.

There will now follow a brief overall description of the CPU design strategy utilized in the CPU of the Radin article followed by a more specific description of the details of the CPU insofar as is deemed necessary to provide a basis for understanding how the present invention fits into the overall system architectural scheme.

Conventional CPUs for general purpose systems in the middle range of cost are organized as hardwired microprocessors "interpreting" the architecture of the CPU. Thus the execution of a CPU instruction normally requires the execution of several "micro-instructions" which normally reside in a high-speed memory called a "control store." The number of such micro-instructions (or "machine cycles") required to execute an average CPU instruction depends on the power (hence cost) of the underlying microprocessor, the complexity of the CPU architecture, and the application being run (i.e., the instruction mix). Typically, for instance, an IBM S/370 model 168 will require 3–6 cycles per S/370 instruction, a model 148 will take 10–15 and a S/360 model 30 will need over 30 cycles.

Very sophisticated S/370 CPU designs have demonstrated the possibility of approaching one machine cycle per instruction by using techniques of look-ahead, parallel execution and keeping branch histories.

Instruction mixes for different application types show differences in frequency of execution of instructions. For instance, scientific applications will use the S/370 floating point instructions and commercial applications will use decimal arithmetic. But, especially when an entire running system is traced instead of just the application code, there is a remarkable similarity in the list of most popular instructions. Moreover, these tend to be rather simple functions, such as load, store, branch, compare, integer arithmetic, logic shifting. These same functions generally are found to be in the instruction repertoire of the underlying microprocessor. Thus, for these functions, it was considered wasteful to pay the interpretive overhead necessary when the micro-architecture does not precisely match the CPU architecture.

Therefore, the primitive instruction set designed for the subject primitive reduced instruction set machine system may be directly executed by hardware. (In the subsequent description, the acronym PRISM will be used instead of the full expression PRimitive Instruction Set Machine for convenience of reference.) That is, every primitive instruction takes exactly one machine cycle. Complex functions are implemented in "microcode" just as they are in conventional CPUs, except that in the present system this microcode is just code; that is, the functions are implemented by software subroutines running on the primitive instruction set.

The advantages of micro-code that accrue because it resides in high-speed control store virtually disappears with a memory hierarchy in which the cache is split into a part that contains data and a part that contains instructions. The instruction cache acts as a "pageable" control store because frequently-used functions will, with very high probability, be found in this high-speed memory. The major difference is that in a conventional CPU the architect decides in advance which functions will most frequently be used across all applications. Thus, for instance, double precision floating point divide always resides in high speed control store while the First Level Interrupt Handler may be in main memory. With an instruction cache it is recent usage that decides which functions will be available more quickly.

With this approach, the number of cycles required to do a particular job is at worst no more than on a conventional (low-to-moderately priced) CPU in which the complex instructions have been microprogrammed. But by carefully defining the primitive instructions to be an excellent target machine for the compiler, it has been found that far fewer cycles are actually required. In fact, for systems programs, fewer instructions are required than S/370 instructions.

Most instruction mixes show that between 20% and 40% of instructions go to storage to send or receive data, and between 15% and 30% of instructions are branches. Moreover, for many applications, a significant percent of the memory bandwidth is taken for I/O. If the CPU is forced to wait many cycles for storage access its internal performance will be wasted.

The second major goal of the present (PRISM) system design, therefore, was to organize the storage hierarchy and develop a system architecture to minimize CPU idle time due to storage access. First, it was clear that a cache was required whose access time was consistent with the machine cycle of the CPU. Secondly a "store-in-cache" strategy was used (instead of "storing through" to the backing store) so that the 10% to 20% of expected store instructions would not degrade the performance severely. (For instance, if the time to store a word is ten cycles, and 10% of instructions are stores, the CPU will be idle about half the time unless it can overlap execution of the instructions following the store.) But a CPU organization which needs a new instruction at every cycle as well as accessing data every third cycle will be degraded by a conventional cache which delivers a word every cycle. Thus the cache was split into a part containing data and a part containing instructions. In this way the bandwidth to the cache was effectively doubled and asynchronous fetching of instructions and data from the backing store was permitted.

Conventional architectures make this decision difficult because every store of data can be a modification of an instruction, perhaps even the one following the store. Thus the hardware must ensure that the two caches are properly synchronized, a job that is either expensive or degrading, or (generally) both. Even instruction prefetch mechanisms are complex since the effective address of a store must be compared to the Instruction Address Register.

It has been found, however, that as soon as index registers were introduced into computers the frequency of instruction modification fell dramatically, until today, instructions are virtually never modified. Therefore, the PRISM architecture does not require this hardware broadcasting. Instead it exposes the existence of the split cache and provides instructions by which software can synchronize the caches when required, which is only in such functions as "program fetch."

Similarly, in conventional systems in which the existence of a cache is unobservable to the software, I/O must (logically) go through the cache. This is often accomplished in less expensive systems by sending the I/O physically through the cache. The result is that the CPU must wait while the I/O proceeds, and that after an I/O burst the contents of the cache no longer reflect the working set of the process being executed, forcing it back into transient mode. Even in expensive systems a broadcasting or directory-duplication strategy may result in some performance degradation.

It was noted that responsibility for the initiation of I/O in current systems was evolving toward system access methods using fixed block transfers and a buffer strategy which normally moved data between subsystem buffers and user areas (e.g., IMS, VTAM, VSAM, paging). This implies that the access method knows the location and extent of the buffer and knows when an I/O transfer is in process. Thus this software can properly synchronize the caches, and the "channel" (Direct Memory Adapter in the PRISM system) can transmit directly to and from the backing store. The result of this system approach is that even when half of the memory bandwidth is being used for I/O the CPU is virtually undegraded.

Notice that in all of the preceding discussions an underlying strategy is being applied. Namely, wherever there is a system function which is expensive or slow in all its generality, but where software can recognize a frequently occurring degenerate case (or can move the entire function from run time to compile time) that function is moved from hardware to software, resulting in lower cost and improved performance.

One interesting example of the application of this overall design strategy concerns managing the cache itself. In the PRISM system the cache line is 32 bytes and the largest unit of a store is four bytes. In such a cache, whose line size is larger than the unit of a store and in which a "store in cache" approach is taken, a store directed at a word which is not in the cache must initiate a fetch of the entire line from the backing store into the cache. This is because, as far as the cache can tell, a load of another word from this line might be requested subsequently. Frequently, however, the store is simply the first store into what, to the program, is newly acquired space. It could be temporary storage on a process stack (e.g., PL/I Automatic) just pushed on procedure call; it could be an area obtained by a Getmain request; or it could be a register store area used by the First Level Interrupt Handler. In all of these cases the hardware does not know that no old values from that line will be needed, while to the software this situation is quite clear.

Accordingly, an instruction has been defined in the PRISM system called SET DATA CACHE LINE, which instructs the cache to establish the requested line in its directory but not to get its old values from the backing store. (Thus, after execution of this instruction, the values in this line will be whatever happened to be in the cache at the time.) If this instruction is executed whenever fresh storage is acquired unnecessary fetches from the backing store will be eliminated. (On the other hand, the execution of the instruction for each new line itself adds CPU cycles. Performance modelling on specific hardware configurations running specific applications will indicate the best tradeoff.)

Similarly when a scratch storage area is no longer needed, executing the instruction INVALIDATE DATA CACHE LINE will turn the "changed" bit off in the cache directory entry corresponding to the named line, thus eliminating an unnecessary storeback. (See copending PCT application Ser. No. 82/01830).

The above general discussion of the PRISM features which result in overlapped access to the cache between instructions and data, overlapped backing store access among the caches and I/O, less hardware synchronizing among the caches and I/O, and techniques to improve the cache hit ratios, indicates the overall flavor of the PRISM design objectives.

However, to fully realize the potential objectives of the PRISM system's overall design approach, it has been found advantageous to include certain hardware modifications whereby a number of powerful one-machine cycle executable instructions are available. Five of these architectural features are set forth and described in the present application and the four copending related patent applications:
U.S. patent application Ser. No. 509,733
U.S. patent application Ser. No. 509,744
U.S. patent application Ser. No. 509,734
U.S. patent application Ser. No. 566,965

RELATED U.S. PATENT APPLICATIONS

The subject application is related to other copending applications having different inventorship entities and owned by the same assignee as the present application. These other applications:

(1) U.S. patent application Ser. No. 509,733, entitled "Mechanism for Implementing One Machine Cycle Executable Trap Instructions in a Primitive Instruction Set Computing System," by M. A. Auslander, H. Hao, P. W. Markstein and G. Radin.

(2) U.S. patent application Ser. No. 509,744, entitled "Condition Register Architecture for a Primitive Instruction Set Machine," by M. Auslander, J. Cocke, H. Hao, P. W. Markstein and G. Radin.

(3) U.S. patent application Ser. No. 509,734, entitled "Mechanism for Implementing One Machine Cycle Executable Branch-On-Bit-In-Any-Register Instructions in a Primitive Instruction Set Computing System," by M. Auslander, H. Hao, M. Hopkins, P. W. Markstein, G. Radin and W. S. Worley.

(4) U.S. patent application Ser. No. 566,965, entitled "Internal Bus Architecture for a Primitive Instruction Set Machine," by J. Cocke, D. Fisk, L. Pereira and G. Radin.

The two following PCT applications filed Dec. 30, 1982 are related to the present application in that they also have particular memory hierarchy including a split cache and to an address translation mechanism respectively.

(1) PCT Ser. No. U.S. 82/01830, entitled "Hierarchical Memory System Including Separate Cache Memories for Storing Data and Instructions," by F. P. Carrubba, J. Cocke, N. H. Kreitzer and G. Radin.

(2) PCT Ser. No. U.S. 82/01829, entitled "Virtual Memory Address Translation Mechanism with Controlled Data Persistence," by A. Chang, J. Cocke, M. F. Mergen and G. Radin.

PRIOR ART

An article entitled "The 801 Minicomputer," by George Radin, published in ACM SIGPLAN NOTICES, Vol. 17, No. 4, April 1982, pages 39–47, includes a general description of an experimental computer whose operational characteristics depend to a large extent on a very fast memory subsystem having separate caches for instruction and data and also having a primitive very basic instruction set providing most commonly used machine operations most of which should be executable in a single machine cycle. The present one cycle executable Mask and Rotate instruction has particular utility in such a machine architecture.

A similar CPU architecture has been described by Patterson and Sequin in "RISC 1: a Reduced Instruction Set VLSI Computer," in the IEEE 8th Annual Symposium on Architecture Conference Proceedings of May 12–14, 1981, at pages 443–449, and in expanded form in IEEE Computer, September 1982 at pages 8–20. The RISC 1: system is stated to be a reduced instruction set machine. No reference is made to any special mask and rotate instruction and hardware for implementing same in this article.

The results of the various Mask Rotate Instructions of the present invention and the disclosed mechanism for implementing same are very well known in the data processing arts. In fact, it is the known usefulness of these functions which led to the development of the herein disclosed set of instructions and hardware.

U.S. Pat. No. 3,982,229 of Rouse et al, discloses a set of instructions and logic circuit means for performing some of the functions specified by the present invention. It is to be noted, however, that the nature of the instructions requires a number of specific arithmetic operations to be performed by the implementation circuitry which would of necessity require additional machine cycles. An example of this is the determination of the rightmost extent of the mask which must be determined by adding (subtracting) the quantities P1 and P2. Also, certain dedicated working registers of the logic circuitry would have to be separately loaded before the specified operations could be performed. This is in contrast to the incorporation of the present mechanism into the data flow of the host CPU having complete access to the multi-port general purpose registers, etc.

The inventors are not aware of any other prior art patents which disclose the specific instructions and implementing mechanism set forth and claimed herein.

SUMMARY AND OBJECTS OF THE INVENTION

The primary object of the present invention is to provide a set of instructions which utilize the functions of rotation, shifting and merging under mask and a mechanism for performing the same in a single machine cycle.

It is a further object to provide such an instruction set and mechanism whereby any designated field in one operand may be inserted in and replace any designated field of a second operand.

It is another object of the invention to provide such an instruction set and mechanism for performing one machine cycle executable shift instructions where a designated portion of subject word may be shifted into and thus replace a portion of a second object word or shifted into an object word which, in effect, contains all zeros.

It is another object of the invention to provide such an instruction set and mechanism for performing one cycle executable, rotate and store instructions which provide a mechanism for allowing data from a source field to be stored in a destination field in main memory beginning at any desired byte address.

It is a further object of the invention to provide such an instruction set and mechanism which allows the aforementioned operations to occur over a full word width.

The foregoing and other objects of the present invention are accomplished, in general, by a set of unique one machine cycle, executable Mask and Rotate instructions and to a mechanism for implementing same which mechanism comprises the necessary hardware for performing a wide variety of shift, rotate, insert merge, etc., operations which will be more particularly set forth and described subsequently.

By the appropriate use of this hardware mechanism, via a rich set of Mask and Rotate instructions by a highly intelligent compiler, a wide variety of functions may be implemented in the system.

The mechanism provides a one machine cycle parallel shift and rotate capability up to a full machine word width (i.e., 32-bits in the herein disclosed embodiment). By the appropriate use of these instructions, IBM System 370 short and long shifts may be easily implemented. For a machine that has full word data flow and full word memory interface, the rotate and store instructions provide a powerful and fast means to do storage move characters string operations.

With the disclosed piece of hardware there is provided a means for bit, byte, digital alignment with mask and merge capability for both general purpose register and memory data.

The herein disclosed parallel bit, digit, byte rotate with mask instruction are powerful and useful primitive operations for decimal pack and unpack functions as well as being useful for floating point, preshifting and normalization.

Other objects, features and advantages of the invention will be apparent from the subsequent description of the invention as set forth in the accompanying figures.

BRIEF DESCRIPTION OF THE DRAWINGS

FIG. 2 comprises an organizational drawing for FIGS. 2A and 2B.

FIGS. 2A and 2B comprise a functional block diagram and data flow diagram of a CPU designed to utilize the one machine cycle executable Mask and Rotate instructions and mechanism of the present invention.

DESCRIPTION OF THE PREFERRED EMBODIMENT

Figure 1:
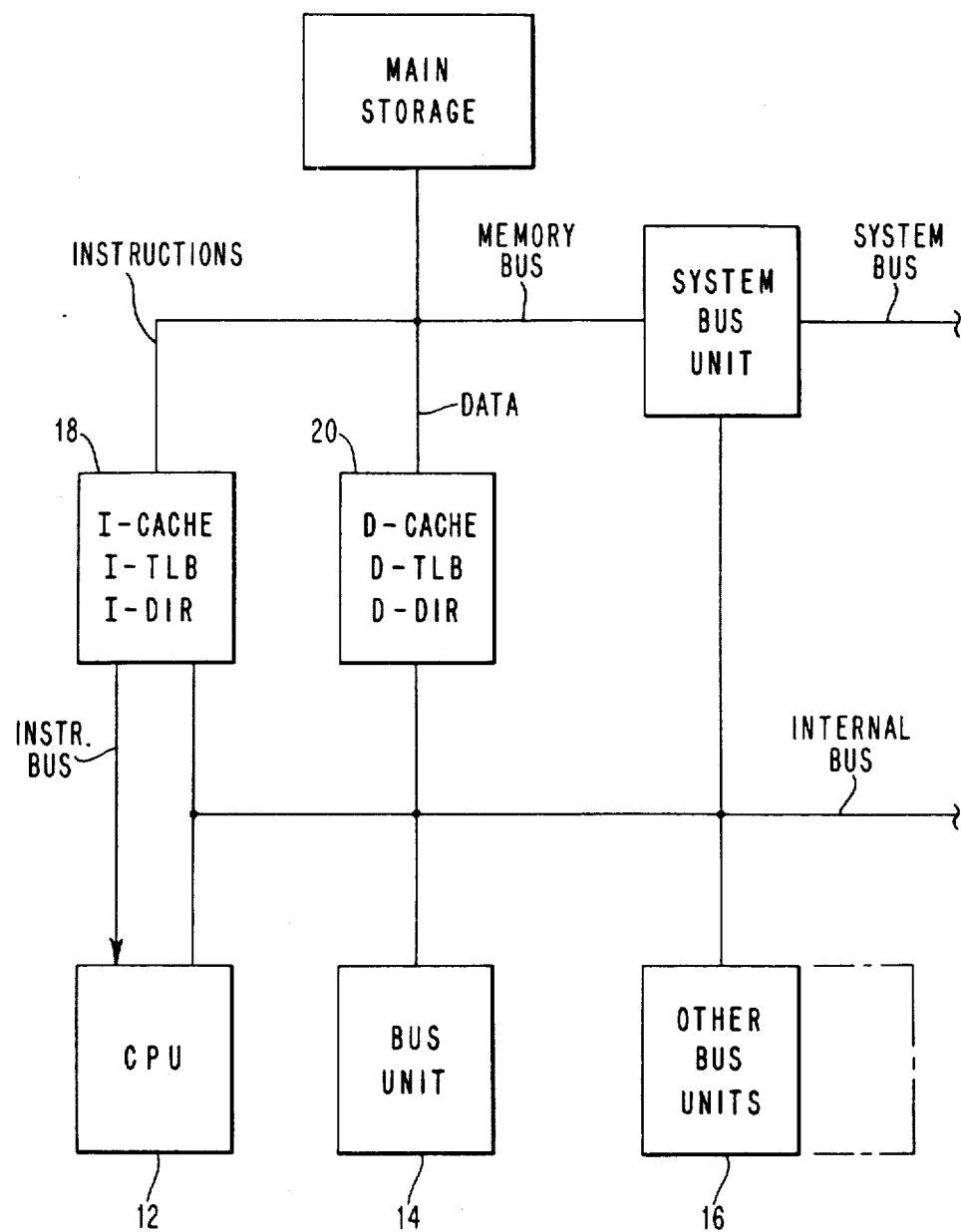
FIG. 1 comprises a high level block diagram of the primary system components including the CPU, main storage, the D and I caches, the system I/O bus and the, internal bus with a number of bus units attached thereto.

General Description of Host PRISM System Architecture

The heart of the previously referenced PRISM system is its Central Processing Unit (CPU). In fact, most of the other aspects of the system are designed to make available to the user the fundamental power of this engine. In addition to its CPU, the overall system consists of the main storage, cache facilities, relocate facilities, and system I/O (See FIG. 1). The cache is split into two parts, one for data, the other for instructions. (See previously referenced PCT Application No. US82/01830.)

As stated previously the CPU architecture is a radically simpler alternative to the complex prior art mainframes. The major distinguishing characteristics of the present PRISM system architecture is that its instructions are designed to execute in a single machine cycle by hardware.

That is, every primitive instruction takes exactly one machine cycle, except for accessing storage, which will usually be overlapped. The term primitive as used herein, relates to time rather than simplicity of concept. Thus primitive is closely associated with the concept of a single machine cycle. That is to say the primitive instructions are those which are effectively executable within a single machine cycle although the actual functions may be relatively complex in terms of what actually takes place within the system hardware.

Going further, the term single machine cycle may be defined in a number of ways. Stated in one way a single machines cycle is the period of the basic system clock which continually repeats itself clock period. Thus within a single machine cycle all of the CPU data flow facility may be used once.

Complex functions are implemented in the system in "micro-code" just as they are in conventional CPUs, except that in the PRISM system this micro-code is just code; that is, the functions are implemented by software subroutines running on the primitive instruction set.

Using the concept of executing complex operations with code resident in cache, the number of cycles required to do a particular job is at worst no more than on a conventional (low-to-moderately priced) CPU in which the complex instructions have been microprogrammed. But by carefully defining the primitive instructions to be an excellent target machine for the compiler, it is found that far fewer cycles are actually required on the CPU.

The one machine cycle executable Mask and Rotate instructions of the present invention are exemplary of newly conceived primitive instructions which are intended to save significant amounts of time in many data reconfiguration situations. Further advantages and uses of the Mask and Rotate instructions will be set forth subsequently.

Thus the PRISM system architecture and its instruction set are the achievement of the following three pervasive strategies. First a fast one-cycle per instruction CPU is defined with an instruction set which was a good target for compilation. Next, an approach to the storage hierarchy, I/O, relocate, and software were developed to overlap these activities with CPU execution, so that it waits minimally.

Finally, an optimizing compiler is developed which produces code which is safe and efficient enough so that the system can be built to assume that all programs have been compiled by this compiler.

In addition to being executable in one machine cycle, the other overriding theme of the instructions is their regularity. This has helped to make the hardware implementation easier. For instance:

All operands must be aligned on boundaries consistent with their size (i.e., halfwords on halfword boundaries, words on word boundaries). All instructions are fullwords on fullword boundaries.

Register name fields are made five bits long so that 32 register implementations are possible when the technology makes this choice desirable. (This aspect of PRISM system archietecture makes it feasible to use the system to emulate other architectures which have 16 GPRs, since 16 PRISM registers are still available for emulator use. A major problem with using the primitive subset of S/370 instructions for emulating complex instructions is the just described register name field restriction.)

Four byte instructions also allow the target register of every instruction to be named explicitly so that the input operands need not be destroyed. This is generally called a "three address" format.

The PRISM system is a true 32-bit architecture, not a 16-bit architecture with extended registers. Addresses are 32-bits long; arithmetic is 32-bit two's complement; logical and shift instructions deal with 32 bit words (and can shift distances up to 31).

The major components of the PRISM CPU shown in the data flow diagram of FIG. 2 are a two-input ALU, a five-port (3-output, 2-input) general purpose register file (32 registers of 32-bits each), and condition logic and the condition register. The condition register (CR) is a 32-bit register which reflects the effect of certain operations, and provides a mechanism for testing (and branching).

Tables 1(a) and 1(b) comprise a complete listing of the 32-bits in the condition register as well as their function in the overall CPU architecture. Very few of the condition register bits enter into the operation of the present invention relating to the implementation of the present "one machine cycle executable Mask and Rotate instructions" only the setting and use of those bits will be described subsequently. The great bulk of the other condition register bits, their setting and use is believed to be quite straightforward and well-known to those skilled in the art.

TABLE 1(a)

| Condition Register Bit Designation | | |
|---|---|---|
| Bit | Name | Description |
| 0 | SO | Summary Overflow |
| 1 | OV | Overflow |
| 2 | LT | Compares Less Than, Negative Value |
| 3 | GT | Compares Greater Than, Positive Value |
| 4 | EQ | Compares Equal, Zero Value |
| 5 | LL | Logical Less Than |
| 6 | LG | Logical Greater Than |
| 7 | CA | Carry from bit 0 |
| 8 | C4 | Carry from bit 4 |
| 9 | C8 | Carry from bit 8 |
| 10 | C12 | Carry from bit 12 |
| 11 | C16 | Carry from bit 16 |
| 12 | C20 | Carry from bit 20 |
| 13 | C24 | Carry from bit 24 |
| 14 | C28 | Carry from bit 28 |
| 15 | CD | Carry from any 4-bit nibble |
| 16 | PZ | Permanent Zero |
| 17-25 | | (Reserved for future use) |
| 26 | EC0 | External Condition 0 |
| 27 | EC1 | External Condition 1 |
| 28 | EC2 | External Condition 2 |
| 29 | EC3 | External Condition 3 |
| 30 | BB | Bus Busy (for Conditional Bus Operations) |
| 31 | HO | Halfword Overflow (overflow from lower 16 bits) |

TABLE 1(b)

Functional Description of the Bits in the Condition Register (Note: Bits not set by an instruction retain their old values.)

Bit 0 (SO) is the Summary-Overflow bit. Whenever an instruction sets the overflow bit to indicate overflow, it sets the SO bit to one, otherwise the SO bit is unchanged. (The use of overflow as a special indicator in divide step does not affect Summary-Overflow.)

Bit 1 (OV), the Overflow bit, is set to indicate that an overflow has occurred during an instruction operation. It is set to one on add and subtract instructions if the carry out of bit zero is not equal to the carry out of bit one. Otherwise it is set to zero. It also functions as a special purpose indicator for the Divide Step instructions. It is not altered by the compare instructions.

Bits 2-are set to indicate the computation result of the executed instruction.

Bit 5 (LL), the Logical-Less-Than bit, and

Bit 6 (LG), the Logical-Greater-Than bit, are set considering the two operands as 32-bit unsigned integers. Bit 2 (LT), the Less-Than bit, Bit 3 (GT), the Greater-Than bit, and Bit 4 (EQ), the Equal bit, are set considering the two operands as 32-bit signed integers in two's complement representation.

Bits 2-6 are also set by the compare and logical instructions.

Bit 7 (CA), the Carry bit, is set to indicate a carry from bit 0 of the computed result. On add and subtract instructions it is set to one if the operation generates a carry out of bit 0. If there is no carry out it is set to zero. It also functions as a special-purpose indicator for the Divide and Multiply instructions. It is not altered by the compare instructions. Bits 7-14 indicate carry outs of each nibble in the ALU. Bit 8(C4) is set to 1 if there is a carry out of bit 4. It is set to 0 if there is no carry out. Bits 9-14 (C8-C28) are set similarly. These carries are provided to assist in performing decimal arithmetic.

Bit 15 (CD) is set to 1 if there is a carry out of any 4-bit nibble. Otherwise it is set to 0.

Programming note: CD can be used to verify that all of the decimal digits in a number are valid.

Bit 16 (PZ) is the permanent-zero bit. It is always zero and it cannot be reset to one. Its presence provides for an unconditional branch by use of the Branch False instruction, where the permanent zero bit is specified.

Bits 17-25 are reserved bits. They are implemented but are not modified by any conditions in the PRISM system.

These bits of the condition register can be arbitrarily set by the Load Condition Register instruction. Subsequent fetches or tests will reflect those values.

Bits 26-29 (EC0 through EC3), External Condition Bits. These bits are set to the values of the corresponding CPU inputs EXT-COND-0 through EXT-COND-3 when the EXT-COND-VALID is active.

Bit 30 (BB), the Bus Busy bit, is set to 1 if a CBO, CBOU, or CBOI instruction could not be executed by a bus unit because it was busy, otherwise it is set to zero for those instructions. It is unchanged by other instructions.

Bit 31 (HO), the Half Word Overflow bit, is set to indicate that an overflow on the lower 16 bits has occurred during an instruction operation. It is set to one on add and subtract instructions if the carry out of bit 16 is not equal to the carry out of bit 15. Otherwise it is set to zero. It is not altered by the compare instruction.

Bits 2-6 are also set by the Mask and Rotate instructions to indicate the sign and magnitude of the register which is affected by the mask or rotate operation.

The MQ register is a 32-bit register whose primary use is to provide a register extension to accommodate the product for the Multiply Step instruction and the dividend for the Divide Step instruction. It is also used as an operand storage location for long shift and rotate and store instructions.

The Instruction Register is a 32-bit register which is quite conventional in nature. The following instruction formats illustrated in Table 2(a) are utilized in the system.

The instruction address register is conventional in nature and points to the location in memory where a desired instruction is resident.

The Mask and Rotate (M&R) Logic block contains the logic circuitry necessary to perform the M&R instructions specifically disclosed and described herein.

The Condition Logic and Condition Register is conventional to the extent that the setting of the various bits therein is required as the result of specified conditions which do or do not occur as a consequence of various system operations. Details of the particular condition register architecture utilized in the herein disclosed preferred embodiment of a PRISM system architecture are set forth and described in previously referenced, concurrently filed, U.S. patent application Ser. No. 509,744.

Both the Data and Instruction Cache Interfaces provide paths for providing instruction addresses and data between the two caches and the CPU. Details of the operation of these caches are set forth in previously reference copending PCT application Serial No. 82/01830.

All instructions are four bytes long and are located on fullword boundaries.

Bits 0-5 always specify the op code. For some instructions, bits 21-31 specify extended op codes.

The remaining bits contain one or more of the following fields, in the indicated bit positions:

TABLE 2(a)

Instruction Formats

D-form, UL-form

```
0      6  11  16      31
| OPCD | RT | RA |  D  |
            | RS |
            | BI |
```

M-form

```
0      6  11  16  21     31
| OPCD | RT | RA | RB | MASK |
                 | SH |
```

X-form

```
0      6  11  16  21  31
| OPCD | RT | RA | RB | EO |
       | RS |      | SH |
       | BI |
```

Table 2(b) contains a definition of the various instruction fields used in the instruction formats illustrated in Table 2(a).

TABLE 2(b)

OPCD (0-5)
    The basic op code field of the instruction.
RT (6-10)
    Name of the register used as the "target" to receive the result of an instruction.
RS (6-10)
    Name of the register used as a source for an instruction.
RA (11-15)
    Name of the register used as the first operand or as the target for rotate instructions.
RB (16-20)
    Name of the register used as the second operand.
BI (6-10)
    Immediate field specifying a register bit or a trap mask.
SH (16-20)
    Immediate field specifying a shift amount.
D (16-31)
    Immediate field specifying a 16-bit signed integer in two's complement notation. When this field is used with other fields that are 32-bits in length the D field is always sign extended.
MASK (21-31)
    Immediate field specifying a 32-bit string, consisting either of a substring of ones surrounded by zeros or a substring of zeros surrounded by ones. The encoding is as follows:
Bit 21
    0 = ones surrounded by zeros
    1 = zeros surrounded by ones
Bits 22-26
    Index to leftmost bit of substring
Bits 27-31
    Index to rightmost bit of substring
A mask field of '10000011111' generates an all zero mask. A mask field of '00000011111' generates an all one mask. The result of specifying an invalid mask (i.e. first index greater than last index) is undefined.
EO (21-31)
    The extended op code.

The four previously referenced copending applications filed concurrently with the present application all relate to specific hardware enhancements which render such a PRISM system more efficient.

General Description of the Disclosed Mask and Rotate Instruction and the Mechanism for Implementing Same The architecture of the PRISM system as generally set forth in the G. Radin article is greatly enhanced by the rich set of one cycle mask and rotate instructions described herein. These were developed not only to introduce a fast and efficient means for performing bit shift, byte alignment, merge and insert functions, but also provide a set of powerful primitives for emulating 370 shift, move and many storage to storage type instructions.

The following functions all executable in one machine cycle are made available by the herein disclosed hardware. The contents of a register may be ring shifted up to 31 positions (specified in another register or in an immediate field). Using a mask (in another register or in an immediate field) this shifted word may be merged with all zeros (i.e., isolate the field) or with any other register (i.e., merge), or with the result of the previous shift (i.e., long shift). The result may then be stored back into any other register or into storage (i.e., move character string). This last facility allows misaligned source and target character string moves to execute as fast as two characters per cycle.

Rotate Instructions with Mask

The processor performs rotate operations on data from a general purpose register (GPR) and returns the result, or a portion of the result, to a general purpose register or to main storage.

The rotate operations move a specified number of bits left. The bits that exit from bit position 0 enter at bit position 31 (i.e., a ring shift).

The rotate instructions set bits in the Condition Register (CR) according to the value of register RA at the completion of the instruction. The CR is set as if a compare between register RA and the value zero had been performed.

The result of the rotate instruction is either inserted into the register under control of the mask provided, or is AND'ed with the mask before being loaded into the register. This operation is effected in the present embodiment by merging (inserting) into a string of all '0's.

When the rotate with insert is used, the result of the rotate operation is placed in register RA under control of the provided mask. If a mask bit is 1, the associated bit of the rotated data (0 or 1) will be placed into register RA; if the mask bit is a 0 the associated data bit (0 or 1) from the register will remain unchanged.

The rotate left instructions allow rotate right instructions to be performed (in concept) by a rotate left of $32-N$, where N is the number of positions to rotate right.

Rotate Immediate then Mask Insert, M-form RIMI RA,RS,SH,MASK

| 0 | 6 | 11 | 16 | 21 | 31 |
|---|---|---|---|---|---|
| 15 | RS | RA | SH | MASK | |

The contents of register RS are rotated left SH positions. The rotated data is inserted into register RA under control of the generated mask.
Condition Codes:
  Set: LT, EQ, GT, LG
  Set to 0: LL
Rotate then Mask Insert, M-form RMI RA,RS,RB,MASK

| 0 | 6 | 11 | 16 | 21 | 31 |
|---|---|---|---|---|---|
| 14 | RS | RA | RB | MASK | |

The contents of register RS are rotated left the number of positions specified by bits 27–31 of register RB. The shifted data is inserted into register RA under control of the generated mask.
Condition Codes:
  Set: LT, EQ, GT, LG
  Set to 0: LL
Rotate Immediate then AND With Mask, M-form RIMN RA,RS,SH,MASK

| 0 | 6 | 11 | 16 | 21 | 31 |
|---|---|---|---|---|---|
| 13 | RS | RA | SH | MASK | |

The contents of register RS are rotated left SH positions. The rotated data is AND'ed with the generated mask and the result is placed in register RA.
Condition Codes:
  Set: LT, EQ, GT, LG
  Set to 0: LL
Rotate then AND With Mask, M-form RNM RA,RS,RB,MASK

| 0 | 6 | 11 | 16 | 21 | 31 |
|---|---|---|---|---|---|
| 12 | RS | RA | RB | MASK | |

The contents of register RS are rotated left the number of positions specified by bits 27–31 of register RB. The rotated data is AND'ed with the generated mask and the result is placed in register RA.
Condition Codes:
  Set: LT, EQ, GT, LG
  Set to 0: LL 1.9.1.2 Rotate Bit Instruction Rotate Right and Insert Bit, X-form RRIB RA,RS,RB

| 0 | 6 | 11 | 16 | 21 | 31 |
|---|---|---|---|---|---|
| 63 | RS | RA | RB | 85 | |

Bit 0 of register RS is rotated right the amount specified by bits 27–31 of register RB. The bit is then inserted into register RA.
Condition Codes:
  Set: LT, EQ, GT, LG
  Set to 0: LL Shift Instructions The instructions of this group logically perform left and right shifts. The result of each instruction is placed in register RA under control of a generated mask. When the mask bit is a 1, the associated bit of the rotated word is placed in register RA. When the mask bit is a 0, the associated bit from either the MQ register, a word of 32 0's, or a word of 32 sign bits from RS is placed in register RA.

The shift instructions set bits in the CR according to the value of register RA at the completion of the instruction. The CR is set as if a compare between register RA and the value zero had been performed.
Shift Left
SL RA,RS,RB

| 0 | 6 | 11 | 16 | 21 | 31 |
|---|---|---|---|---|---|
| 63 | RS | RA | RB | 64 | |

Register RS is rotated left N bits where N is the shift amount specified in bits 27–31 of register RB. A mask of $32-N$ 1's followed by N 0's is generated when bit 26 of RB is zero. A mask of all 0's is generated when bit 26 of RB is one. The logical AND of the rotated word and the generated mask is stored in RA.
Condition Codes:
  Set: LT, EQ, GT, LG
  Set to 0: LL
Shift Left Immediate with MQ
SLIQ RA,RS,SH

| 0 | 6 | 11 | 16 | 21 | 31 |
|---|---|---|---|---|---|
| 63 | RS | RA | SH | 67 | |

Register RS is rotated left N bits where N is the shift amount specified by SH. A mask of $32-N$ 1's followed by N 0's is generated.

The rotated word is stored in the MQ register. The logical AND of the rotated word and the generated mask is stored in RA.
Condition Codes:
  Set: LT, EQ, GT, LG
  Set to 0: LL
Shift Left with MQ
SLQ RA,RS,RB

| 0 | 6 | 11 | 16 | 21 | 31 |
|---|---|---|---|---|---|
| 63 | RS | RA | RB | 66 | |

Register RS is rotated left N bits where N is the shift amount specified in bits 27–31 of register RB. The rotated word is stored in the MQ register. A mask of 32−N 1's followed by N 0's is generated when bit 26 of RB is zero. A mask of all 0's is generated when bit 26 of RB is one. The logical AND of the rotated word and the generated mask is stored in RA.
Condition Codes:
  Set: LT, EQ, GT, LG
  Set to 0: LL
Long Shift Left Immed
LSLIQ RA,RS,SH

```
0   6   11  16  21  31
[63 |RS |RA |SH | 83 ]
```

Register RS is rotated left N bits where N is the shift amount specified by SH. The rotated word is stored in the MQ register. A mask of 32−N 1's followed by N 0's is generated. The rotated word is then merged with the previous contents of the MQ register, under control of the generated mask. (For each bit of the mask which is one, the respective bit of the rotated word is used. For each bit of the mask which is zero, the respective bit of the previous MQ is used.) The merged word is stored in RA.
Condition Codes:
  Set: LT, EQ, GT, LG
  Set to 0: LL
Long Shift Left
LSLQ RA,RS,RB

```
0   6   11  16  21  31
[63 |RS |RA |RB | 82 ]
```

Register RS is rotated left N bits where N is the shift amount specified in bits 27-31 of register RB. The rotated word is stored in the MQ register. When bit 26 of RB is a zero, a mask of 32−N 1's followed by N zeros is generated. The rotated word is then merged with the previous contents of the MQ register, under control of the generated mask. (For each bit of the mask which is one, the respective bit of the rotated word is used. For each bit of the mask which is zero, the respective bit of the previous MQ is used.) When bit 26 of RB is a one, a mask of 32−N 0's followed by N ones is generated. A word of zeros is used instead of the rotated word. The merged word is stored in RA.
Condition Codes:
  Set: LT, EQ, GT, LG
  Set to 0: LL
Shift Right
SR RA,RS,RB

```
0   6   11  16  21  31
[63 |RS |RA |RB | 68 ]
```

Register RS is rotated left 32−N bits where N is the shift amount specified in bits 27-31 of register RB. A mask of N 0's followed by 32−N 1's is generated when bit 26 of RB is zero. A mask of all 0's is generated when bit 26 of RB is one. The logical AND of the rotated word and the generated mask is stored in RA.
Condition Codes:
  Set: LT, EQ, GT, LG
  Set to 0: LL
Shift Right Immed with MQ
SRIQ RA,RS,SH

```
0   6   11  16  21  31
[63 |RS |RA |SH | 71 ]
```

Register RS is rotated left 32−N bits where N is the shift amount specified by SH. The rotated word is stored into the MQ register. A mask of N 0's followed by 32−N 1's is generated. The logical AND of the rotated word and the generated mask is stored in RA.
Condition Codes:
  Set: LT, EQ, GT, LG
  Set to 0: LL
Shift Right with MQ
SRQ RA,RS,RB

```
0   6   11  16  21  31
[63 |RS |RA |RB | 70 ]
```

Register RS is rotated left 32−N bits where N is the shift amount specified in bits 27-31 of register RB. The rotated word is stored into the MQ register. A mask of N 0's followed by 32−N 1's is generated when bit 26 of RB is zero. A mask of all 0's is generated when bit 26 of RB is one. The logical AND of the rotated word and the generated mask is stored in RA.
Condition Codes:
  Set: LT, EQ, GT, LG
  Set to 0: LL
Long Shift Right Immed
LSRIQ RA,RS,SH

```
0   6   11  16  21  31
[63 |RS |RA |SH | 87 ]
```

Register RS is rotated left 32−N bits where N is the shift amount specified by SH. The rotated word is stored into the MQ register. A mask of N 0's followed by 32−N 1's is generated. The rotated word is then merged with the previous contents of the MQ register, under control of the generated mask. (For each bit of the mask which is one, the respective bit of the rotated word is used. For each bit of the mask which is zero, the respective bit of the previous MQ is used.) The merged word is stored in RA.
Condition Codes:
  Set: LT, EQ, GT, LG
  Set to 0: LL
Long Shift Right
LSRQ RA,RS,RB

```
0   6   11  16  21  31
[63 |RS |RA |RB | 86 ]
```

Register RS is rotated left 32−N bits where N is the shift amount specified in bits 27-31 of register RB. The rotated word is stored into the MQ register. When bit 26 of RB is a zero, a mask of N 0's followed by 32−N 1's is generated. The rotated word is then merged with the previous contents of the MQ register, under control of the generated mask. (For each bit of the mask which is one, the respective bit of the rotated word is used. For each bit of the mask which is zero, the respective bit of the previous MQ is used.) When bit 26 of RB is a one, a mask of N 1's followed by 32−N 0's is generated. A word of zeros is used instead of the rotated word. The merged word is stored in RA.
Condition Codes:

Set: LT, EQ, GT, LG
Set to 0: LL

Shift Right Algebraic Immed
SRAI RA,RS,SH

```
 0   6   11  16   21  31
[ 63 |RS |RA |SH | 77 ]
```

Register RS is rotated left 32−N bits where N is the shift amount specified by SH. A mask of N 0's followed by 32−N 1's is generated. The rotated word is then merged with a word of 32 sign bits from RS, under control of the generated mask. (Sign bits are used wherever the mask is zero.) The merged word is stored in RA.
Condition Codes:
  Set: LT, EQ, GT, LG
  Set to 0: LL Shift Right Algebraic
SRA RA,RS,RB

```
 0   6   11  16   21  31
[ 63 |RS |RA |RB | 76 ]
```

Register RS is rotated left 32−N bits where N is the shift amount specified in bits 27-31 of register RB. A mask of N 0's followed by 32−N 1's is generated when bit 26 of RB is zero. A mask of all 0's is generated when bit 26 of RB is one. The rotated word is then merged with a word of 32 sign bits from RS, under control of the generated mask. (Sign bits are used wherever the mask is zero.) The merged word is stored in RA.
Condition Codes:
  Set: LT, EQ, GT, LG
  Set to 0: LL Shift Right Algebraic with MQ
SRAQ RA,RS,RB

```
 0   6   11  16   21  31
[ 63 |RS |RA |RB | 78 ]
```

Register RS is rotated left 32−N bits where N is the shift amount specified in bits 27-31 of register RB. A mask of N 0's followed by 32−N 1's is generated. A mask of all 0's is generated when bit 26 of RB is one. The rotated word is stored in the MQ register. The rotated word is then merged with a word of 32 sign bits from RS, under control of the generated mask. (Sign bits are used wherever the mask is zero.) The merged word is stored in RA.
Condition Codes:
  Set: LT, EQ, GT, LG
  Set to 0: LL Shift Right Alg. Immed with MQ
SRAIQ RA,RS,SH

```
 0   6   11  16   21  31
[ 63 |RS |RA |SH | 79 ]
```

Register RS is rotated left 32−N bits where N is the shift amount specified by SH. A mask of N 0's followed by 32−N 1's is generated. The rotated word is stored in the MQ register. The rotated word is then merged with a word of 32 sign bits from RS, under control of the generated mask. (Sign bits are used wherever the mask is zero.) The merged word is stored in RA.
Condition Codes:
  Set: LT, EQ, GT, LG
  Set to 0: LL

Rotate and Store Instructions

The rotate and store instructions allow movement of data from a source field to a destination field where these fields may begin at any address.

The result of each instruction is placed in main storage under control of a generated mask. When the mask bit is a 1, the associated bit of the rotated word is placed in main storage. When the mask bit is a 0, the associated bit from the MQ register is placed in main storage.

Rotate Right and Store with Update
RRSU RS,RA,RB

```
 0   6   11  16   21  31
[ 63 |RS |RA |RB | 92 ]
```

The contents of RS are rotated right N bits where N is the amount specified in bits 27-31 of RB. The rotated word is stored in the MQ register. A mask of N 0's followed by 32−N 1's is generated. The rotated word is merged with the previous contents of the MQ register, under control of the generated mask. The merged word is stored in the location pointed to by RA+4. The value RA+4 is also stored back in RA.
Condition Codes:
  Set: None Rotate Right and Store Right Marks
RRSRM RS,RA,RB

```
 0   6   11  16   21  31
[ 63 |RS |RA |RB | 94 ]
```

The contents of RS are rotated right N bits where N is the amount specified in bits 27-31 of RB. The rotated word is stored in the MQ register. A mask of N 0's followed by 32−N 1's is generated. The rotated word is merged with the previous contents of the MQ register, under control of the generated mask. The merged word is stored in the location pointed to by RA with the byte marks generated according to the following table:

| RA(30:31) | MARKS |
|---|---|
| 00 | 1111 |
| 01 | 0111 |
| 10 | 0011 |
| 11 | 0001 |

A 0 means the corresponding byte in storage is unaltered, and a 1 means the corresponding byte from the merged word is placed in storage.
Condition Codes:
  Set: None Rotate Right and Store Left Marks
RRSLM RS,RA,RB

```
 0   6   11  16   21  31
[ 63 |RS |RA |RB | 93 ]
```

The contents of RS are rotated right N bits where N is the amount specified in bits 27-31 of RB. The rotated word is stored in .the MQ register. A mask of N 0's followed by 32−N 1's is generated. The rotated word is merged with the previous contents of the MQ register, under control of the generated mask. The merged word is stored in the location pointed to by RA with the byte marks generated according to the following table:

| RA(30:31) | MARKS |
|---|---|
| 00 | 1000 |
| 01 | 1100 |
| 10 | 1110 |
| 11 | 1111 |

A 0 means the corresponding byte in storage is unaltered, and a 1 means the corresponding byte from the merged word is placed in storage.
Condition Codes:
  Set: None
Rotate Left and Store with Update
RLSU RS,RA,RB

```
0  6  11  16  21  31
63 |RS |RA |RB | 88 |
```

The contents of RS are rotated left N bits where N is the amount specified in bits 27-31 of RB. The rotated word is stored in the MQ register. A mask of 32−N 1's followed by N 0's is generated. The rotated word is merged with the previous contents of the MQ register, under control of the generated mask. The merged word is stored in the location pointed to by RA-4. The address in RA is decremented by 4 and stored back in RA.
Condition Codes:
  Set: None
Rotate Left and Store Right Marks
RLSRM RS,RA,RB

```
0  6  11  16  21  31
63 |RS |RA |RB | 90 |
```

The contents of RS are rotated left N bits where N is the amount specified in bits 27-31 of RB. The rotated word is stored in the MQ register. A mask of 32−N 1's followed by N 0's is generated. The rotated word is merged with the previous contents of the MQ register, under control of the generated mask. The merged word is stored in the location pointed to by RA with the byte marks generated according to the following table:

| RA(30:31) | MARKS |
|---|---|
| 00 | 1111 |
| 01 | 0111 |
| 10 | 0011 |
| 11 | 0001 |

A 0 means the corresponding byte in storage is unaltered, and a 1 means the corresponding byte from the merged word is placed in storage.
Condition Codes:
  Set: None
Rotate Left and Store Left Marks
RLSLM RS,RA,RB

```
0  6  11  16  21  31
63 |RS |RA |RB | 89 |
```

The contents of RS are rotated left N bits where N is the amount specified in bits 27-31 of RB. The rotated word is stored in the MQ register. A mask of 32−N 1's followed by N 0's is generated. The rotated word is merged with the previous contents of the MQ register, under control of the generated mask. The merged word is stored in the location pointed to by RA with the byte marks generated according to the following table:

| RA(30:31) | MARKS |
|---|---|
| 00 | 1000 |
| 01 | 1100 |
| 10 | 1110 |
| 11 | 1111 |

A 0 means the corresponding byte in storage is unaltered, and a 1 means the corresponding byte from the merged word is placed in storage.
Condition Codes:
  Set: None It will be noted that all of the above instructions are quite specific and that all instruction fields whether comprising data or addresses must be rigorously specified. It should be clearly understood that the proper use of these primitive instructions by the compiler or programmer requires or intimate knowledge of the system architecture. This is, of course, a requirement of any instruction set. The use of the present instruction set by a programmer or compiler is clearly within the knowledge of persons skilled in the programming arts, it being clearly understood that the provision of the present unique instruction set and the mechanism for implementing same is the sole subject of the present invention.

Uses and Advantages of the PRISM System's Mask and Rotate Instructions

The PRISM system's rich set of instructions which rotate the contents of a register by a specified amount, combine the rotated word with bits from another source under control of a mask, and insert the result into a target location. Optionally, the rotated (but unaltered) word can be stored in a special register for merging with the result of the next rotate and mask instruction to be executed. There are a large number of applications of these instructions in common computing tasks; examples of some of these applications will be given, using both PRISM instructions, and System/370 instructions, to show by way of contrast how much easier and shorter these tasks are with these mask and rotate instructions. It should be emphasized that these instructions perform rather complex functions; they are primitive only in the sense that they can be realized in one machine cycle using current state-of-the-art circuit families. The mask is shown in hexadecimal form for convenience of representation but must be in coded binary form (i.e., edge addresses) for use in the system of the present invention.

A familiar task is to isolate a field within a register, and align this field appropriately for further computation. For example, in simulating floating point computation, one might have to isolate bits 1-7 of a word (the characteristic), and position it two bits from the right of a register to use as a normalization shift amount. With the PRISM instruction set, this is accomplished by:

| RIMN | P,X,10,'000001FC'X |
|---|---|

The above instruction rotates the contents of X 10 bits to the left, logically "AND" the rotated word with the mask '000001FC' and stores the result in register P. (P and X may be the same register if desired.) To achieve the same effect on System/370, one might code:

| SLL | X,1  | remove unwanted bits on the left |
| SRL | X,25 | remove unwanted bits on the right |
| SLL | X,2  | position characteristic 2 bits from right. |

If the result should have been stored in a different register without disturbing X, the sequence would require one additional instruction.

The opposite problem, to insert a field in a register, is demonstrated by copying bits 23-29 of register X into bits 1-7 of register R without disturbing any other of register 'R's bits. PRISM does it with:

| RIMI | R,X,22, '7F000000'X |

The rotate and mask instruction rotates the contents of register X left 22 bits, and bits of the rotated word are copied into R for all bit positions where the mask has 1 bits. The System/370, and other machines, require a sequence such as:

| N   | X,=X'000001FC'  | Isolate bits to be saved |
| N   | R,=X'80FFFFFF'  | Zero bits which will be replaced |
| SLL | X,22            | Line up words |
| OR  | R,X             | |

The above sequence also destroys register X, whereas the PRISM version leaves R intact.

When a long field, spanning several registers, must be shifted, the rotate instructions make the job easy. Suppose registers 2, 3, 4 and 5 constitute a 128 bit object which must be shifted right 7 bits. With PRISM instructions, it is done as follows:

| SRIQ  | 2,2,7 | Shifts high order word. "Dropped bits" in MQ |
| LSRIQ | 3,3,7 | Shifts next word, gets dropped bits from MQ |
| LSRIQ | 4,4,7 | |
| LSRIQ | 5,5,7 | |

The first instruction rotates register 2 right 7 bits, saving the rotated word in the MQ, and replacing register 2 with the low order 25 bits of the rotated word, and filling the high order 7 bits with zeros. Each of the remaining instructions rotates the next register by 7 bits. The high order 7 bits of the MQ and the low order 25 bits of the rotated word replaces the register, and the rotated word then replaces the MQ.

System/370 is greatly helped by having double register shifts, but the need to capture the bits that move from register 3 to register 4 costs an extra three instructions.

| LR   | 0,3  | get bits which move from register 3 to register 4 |
| SLL  | 0,25 | |
| SRLL | 2,7  | Shift registers 2 and 3 together, 7 bits |
| SRLL | 4,7  | Shift registers 4 and 5 together, 7 bits |
| OR   | 4,0  | Move into reg. 4 bits from right end of reg. 0. |

Finally, suppose a field starting at a byte indicated by the contents of RA are to be moved to a field starting at a byte indicated by register RB, but shifted right by the number of bits specified in the low order 5 bits of register RC. Suppose finally, that RD contains the address of the first byte beyond the field to be moved.

|      | AI   | RA,RA,-4  | Set up to use update form of addressing |
|      | AI   | RB,RB,-4  | Set up to use update form of addressing |
|      | AI   | RD,RD,-4  | Set up to use update form of addressing |
|      | LI   | RT,0      | Set up MQ register |
|      | MTMQ | RT        | |
| LOOP | LU   | RT,RA,4   | effective addr->RA, memory word to RT |
|      | RRSU | RT,RB,RC  | Shift, merge with MQ, store, update index |
|      | C    | RA,RD     | |
|      | BL   | LOOP      | |

In the main loop, the LU instruction computes the effective address as the contents of register RA, plus 4. The effective address replaces RA, and the word of memory addressed by RA replaces RT. The RRSU instruction performs the difficult part of the job. The contents of register RT are rotated right the number of bits specified in register RC, and an effective address is computed by adding 4 to the contents of RA. The word to be stored at the (new) effective address in RA is contructed by taking the high order n bits from the MQ and the low order 32−n bits from the rotated word, where n is the number of bits that RT was rotated right. Finally, the rotated word replaces the MQ. The last two instructions merely close the loop.

For System/370, equivalent code would be:

|      | LA   | RE,0         | Initialize some even-register to zero |
|      | LA   | RA+1,4       | Set up for BXLE instruction |
| LOOP | L    | RE+1,0(RA)   | Load a memory word. |
|      | LR   | RT,RE+1      | Save copy of memory word |
|      | LRS  | RE,0(RC)     | Shift word, high order bits from even register |
|      | ST   | RE+1,0(RB)   | Store shifted word |
|      | LR   | RE,RT        | Move high order bits for next cycle to RE |
|      | AR   | RB,RA+1      | Update address where to store next word |
|      | BXLE | LOOP,RA,RC   | |

The inner loop of the 370 sequence takes 7 instructions compared to 4 for the PRISM sequence. And the 370 is required to have RA in an even register in order to close the loop with a BXLE (otherwise the sequence would be another two instructions longer), and RE is required to be even too, to exploit the System/370's 64-bit shifter.

The above short sequences demonstrate the power and versatility of the one-cycle executable mask and rotate instructions. They are primitive only in the sense that they can be implemented with modern circuit families in one machine cycle; their functional capability however, is very powerful.

Description of the Present Hardware Mechanism for Executing the One Machine Cycle Executable Mask and Rotate Instructions Since the present invention resides primarily in the novel structural combination and the method of operation of well-known computer circuits and devices, and not in the specific detailed structure thereof, the structure, control, and arrangement of these well-known circuits and devices are illustrated in the drawings by use of readily understandable block representations and schematic diagrams, which show only the specific details pertinent to the present invention. This is done in order not to obscure the disclosure with structural details which will be readily apparent to those skilled in the art in view of the description herein. Also, various portions of these systems have been appropriately consolidated and simplified to stress those portions pertinent to the present invention.

Referring to FIG. 1 an overall organizational block diagram of a typical PRISM system architecture is shown. The CPU 12 is depicted as a separate unit, however, it will be understood that the internal bus 10 is actually a composite member of the basic CPU architecture. Specific units shown directly attached to the internal bus 10 are the floating point unit 14 and a block designated other bus units 16 which, as will be readily understood, may comprise a plurality of different units separately attached to the bus 10. The instruction cache 18 and data cache 20 are also illustrated as connected to the internal bus and thus operable under various internal bus operation instruction formats (described previously). A system bus unit 22 is also shown connected to the internal bus which would primarily perform the function of system I/O operations to and from main storage as will be understood by those skilled in the art. No specific instructions for controlling the system bus unit are described herein, however, operation instruction to control such a system bus unit are well known and would be obvious to those skilled in the art.

FIGS. 2A and 2B form a composite functional block and data flow diagram for the PRISM CPU. These two figures are organized as shown in the organizational diagram of FIG. 2.

The data flow within the basic PRISM organization is clearly shown in FIGS. 2A and 2B.

The basic CPU includes a five port general purpose registers block 30 containing thirty two individual registers. The two inputs to the register block RT and RA as well as the three outputs RA, RB, RS indicate the particular instruction designated operands set forth in the previous description of the instruction formats. As will be apparent to those skilled in the art, the (address of the) particular general purpose register in which the various operands are to be stored or from which they are to be fetched would be specified in the various fields of the instruction register.

The organization of the instruction register 32 is straightforward. It should be noted that this is a 32-bit register with the various delineated fields within the register clearly shown in the drawing (designated bits) as well as the mnemonic representations of the various fields as used in the previously described instruction formats. The designated BI, SH and M beneath the primary instruction register box 32 indicates the mnemonic representation given to these fields in certain of the instructions. However it should be understood that these are shown outside of the instruction box for convenience of reference only.

The instruction address register (IAR) 34 is also conventional in nature and would be initially loaded at the beginning of a program and suitably incremented or reloaded by the program subsequently as required. Block 36 labeled (IAR+4) contains the next instruction address.

The data flow from the instruction register 32 and the general purpose registers 30 is clearly shown in the figures thus, for conventional arithmetic operations the two multiplexers 38 and 40 may receive as input operands various fields from the instruction address register 34, instruction register 32 and the specified operands RA, RB from the general purpose registers 30. Thus the ALU 42 performs two operand operations and places the result in output buffer register 44. As will be apparent the output from the ALU may also go directly to the instruction address register 34, the condition logic and condition register block 50, the branch and trap testing logic 52 and the address gate 54 which supplies addresses to the system memory when required.

The output of the buffer register 44 is able to return data to the general purpose registers 30 via the multiplexers 46 and 48 depending upon whether the field RA or RT is specified by the instruction.

The Mask and Rotate logic block 56 which is the subject of the present invention comprises the mechanism which performs the one-machine cycle executable Mask and Rotate operations. The details of the condition logic and condition register block 50 are the subject matter of previously referenced concurrently filed application Ser. No. 509,744.

Block 52 entitled branch and trap testing comprises the circuitry necessary to perform the trap testing function and produce a trap interrupt if necessary and also to perform "branch-on-bit" testing which latter is the subject matter of the two previously referenced copending applications Ser. No. 509,733 and Ser. No. 509,734.

Gates 56 and 58 serve to gate data to and from the system memory as required for certain specified operations. These two gates and buses comprise the Data Cache Interface.

The register MQ shown in the Mask and Rotate logic block 56 is an extension register for storing the overflow contents from a number of arithmetic operations such as multiply and divide. It is functionally located in this block for purposes of the present embodiment as it is utilized during certain mask and rotate instructions which are set forth and claimed herein.

Figure 3:
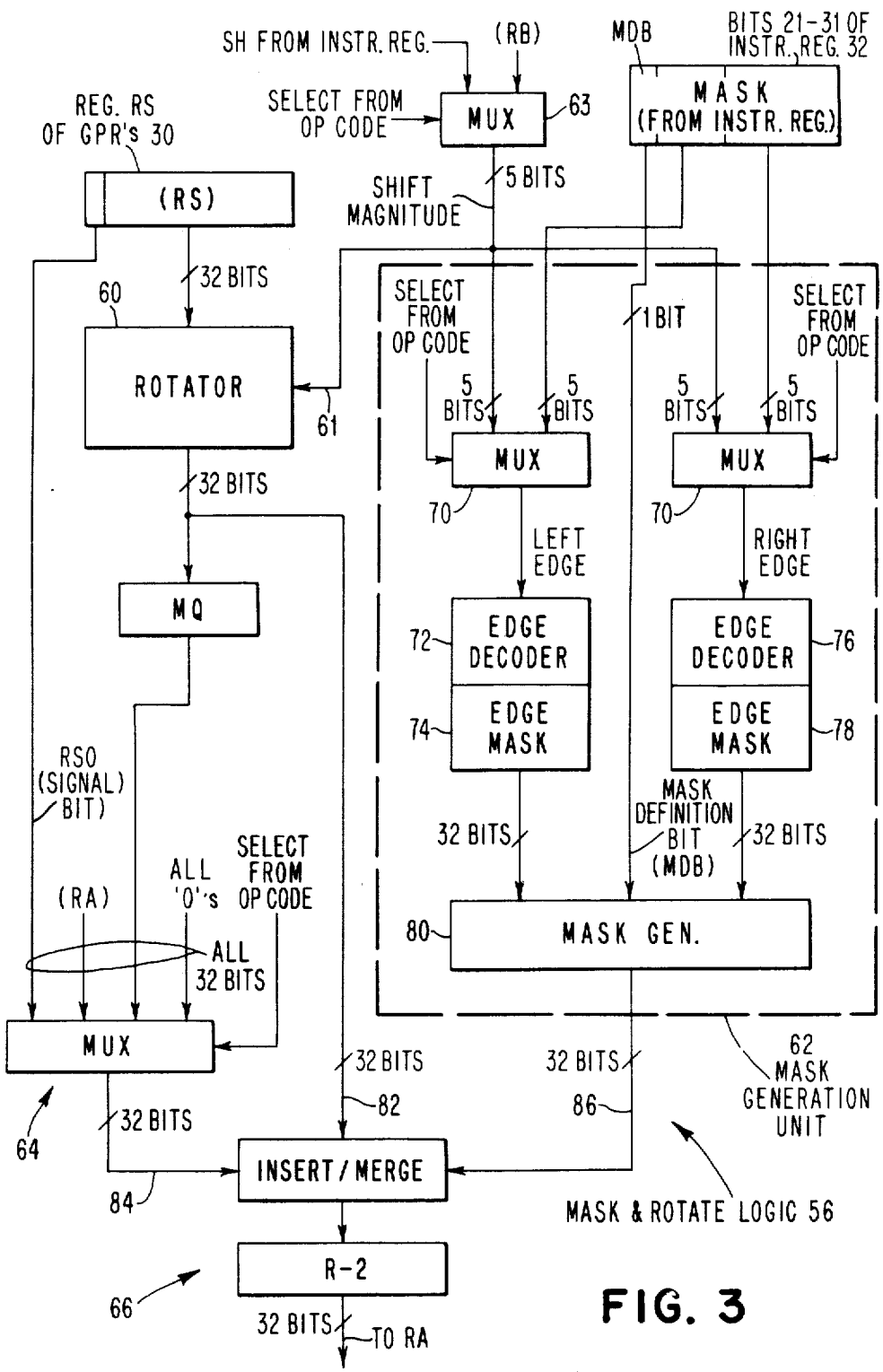
FIG. 3 comprises a portion of the data flow chart of FIG. 2 showing additional details of the hardware necessary to implement the one cycle executable Mask and Rotate instructions of the present invention.

Before proceeding with the description of FIG. 3, which constitutes a combination functional block diagram and flow chart the herein disclosed Mask and Rotate hardware implementation, the following general comments about the overall organization and operation of the hardware mechanism are appropriate.

In the PRISM architecture, the Mask and Rotate unit runs in parallel with the ALU. While the ALU operates on the first two operands from the GPR's, the Mask and Rotate unit operates on the third. Its output can be sent to memory at an address calculated in the ALU or its output can be sent back to the GPR.

The major functional block in the shifter is a Rotator that can rotate a 32-bit input operand any number of bit positions using two to five levels of logic. In parallel with the rotator, a mask is generated to blank fields in the output. In shift instructions, the mask is used to cause zeros to be shifted in from outside the operand field. In a rotate instruction a special mask is specified directly in the instruction. The mask generation function can also be done in two to five levels of logic.

Also in parallel with the rotator, an insert operand is generated from one of four inputs. Either (1) first operand from the GPR, (2) the contents of the MQ register, (3) a word consisting of sign bits from the third operand from the GPR, or (4) a word consisting of zeros is used. This is accomplished in one or two levels of multiplexing.

A last stage of logic called insert/merge is required. The rotated word is used in each bit position containing a "1" in the mask and the insert word is in the rest (i.e., where there is a "0" in the Mask).

The hardware design requirement of the overall Mask and Rotate unit is such that the critical path of the various functional elements comprising said unit be equal to that of the ALU. Therefore, just as with other PRISM instructions only one machine cycle is needed for executing these new instructions.

The Mask and Rotate logic block 56 is detailed in FIG. 3. It should first be noted that the primary inputs to this block from the General Purpose registers are RA, RB and RS. In addition, for certain operations the shift magnitude is obtained from the SH field or from the RB field of the Instruction register 32 (bits 27–31). Various inputs to the multiplexers (MUX's) which select specific inputs to the functional blocks are determined by the Instruction Decoder (not shown) which as will be understood, selects the various operands for use in the various functional units. The particular segments of data which must be gated into these functional units for the various operations are very clearly and specifically set forth in the previous definition and description of the instruction formats. It will be readily understood by those skilled in the art that the Instruction Decoder must monitor the op code field and in certain cases the extended op code field (EO). The EO field forms a part of many of the Mask and Rotate instructions and also many of the other PRISM instruction types. The four primary functional units of the present mechanism comprise the Rotator 60, Mask Generation Unit 62, the mechanism for deriving the subject operand field for the Insert/Merge operations and finally the Insert-/Merge mechanism 66 which permits the combining of the operands from mechanisms 60 and 64 under control of the mask generated by the Mask Generation Unit 62.

As stated previously the Rotator 60 performs an end around operation shift in that any bits shifted out of bit location 0 are reinserted in bit position 31, as will be understood by those skilled in the art. One input to the Rotator is the actual operand to be rotated which in all of the present Mask and Rotate instruction is stored in Register RS of the General Purpose registers. The shift magnitude is the other required input to the Rotator which indicates how many bit positions the operand is to be shifted to achieve the required bit alignment. As will be appreciated from the previous descriptions of the instruction format and definitions, this quantity would either be stored in the SH field of the Instruction Register for shift immediate operations or would be stored in bits 27 to 31 of the General Purpose registers pointed to by the RB field utilized in certain of the instructions. Which of these two areas is accessed for any given operation is determined by the Instruction Decoder and the Multiplexer 63, which is actuated with an appropriate signal from the Instruction Decoder to gate the proper quantities into the Rotator via cable 61.

It will be seen in the figure that the output of the Rotator may either be stored in the MQ register or passed directly into the Insert/Merger Unit 66 where it will be inserted or merged under control of the Mask with one of the four possible operands entering into the Insert/Merge unit from the object operand generating circuit 64. As was stated previously, whether the output of the Rotator goes to the register MQ or the Insert-/Merge Unit 66 may be readily determined by examining the specific definition of each of the possible Mask and Rotate instructions which have been set forth in great detail previously.

Referring now to the Mask Generation Unit 62, it will be noted that this unit consists essentially of a Left Edge and a Right Edge section. This general circuitry allows the construction of essentially two different types of masks. One type of mask which is utilized in the Rotate and Mask instructions comprises a three-part mask consisting of '0's surrounded by '1's or '1's surrounded by '0's. This mask is specified in the mask field in bits 21 to 31 of the Instruction register when a Rotate and Mask instruction is encountered. The definition and use of these bits is clearly indicated in the preceding Table 2(b). It will be noted that bit 21 comprises the Mask Definition bit (MDB) which indicates whether the mask is '1's surrounded by '0's or '0's surrounded by '1's. The remaining ten bits of the mask field specify the Right Edge and Left Edge, respectively, of center portion of the mask.

The second type of mask generated by the Mask Generation unit is a two-part mask utilized for shift instructions and Rotate and Store instructions.

This type of mask comprises '1's followed by '0's or '0's followed by '1's. With these instructions the mask specifications come from either the SH field or register RB. It should be noted in passing that the two-part and three-part masks are utilized exactly the same way in the Insert/Merge Unit 66. Thus, wherever a one occurs in the mask the bit emanating from the Rotator Unit 60 (subject operand) is inserted in the output and wherever a zero occurs in the mask, the bit from the Operand Generation unit 64 (object operand) is placed in the output.

The operation of the Mask Generation unit is relatively straightforward. The actual mask edge specifications are produced by the Programmer or operating system via the compiler and appropriately generated and loaded into the Instruction Register in the SH field or RB register. In a given instruction the source of the Mask data is determined from the op code and the appropriate line of the Multiplexers 70 would be energized. For the three-part Mask previously described, this information would come from the Mask field in the Instruction Register and would specify the Left Edge and Right Edge of the Mask, respectively. With the two-part Mask of the Shift and Rotate and Store instructions only one of the Multiplexers 70 would be energized as determined from the op code.

As will be obvious to those skilled in the art, the box 72 in the Left Edge generating circuitry decodes the 5-bit mask field to determine which bit provides the Left Edge of the mask. This information is transferred to the box 74 which in turn generates the edge mask. The output from this block would be a 32-bit field which would be, for example, '0's followed by '1's beginning at the bit position pointed to by the edge Decoder 72.

The Right Edge Decoder would function in exactly the same way only the output from the right-edge Decoder 76 and the edge mask 78 would, for example, produce a string of '1's followed by '0's at the point of right-edge definition. Thus, the output from block 78 would be a two-part mask. The outputs from blocks 74 and 78 are combined in block 80 which could be as simple as a 32-bit AND circuit to produce the desired mask. It would be trival to change the mask from '1's surrounded by '0's to '0's surrounded by '1's which would merely require going through an inverter. Again, this would be specified by the instruction the necessity of inverting the output would be determined by the output of the Instruction Decoder.

It will be apparent that a two-part Mask may be readily generated by only activating the Left Edge or Right Edge circuitry and combining same with all '1's or all '0's to produce the requisite two-part mask out of the Mask Generator circuit 80.

The functions of such circuitry are considered to be well known in the art, it being noted that the complete mask generation function can be accomplished in two to five logic levels similarly to that possible in the Rotator block 60. In this way the shifting function performed in the Rotator block 60 and the Mask Generation function performed in block 62 are able to proceed substantially in parallel which allows this class of instructions to be performed in one CPU machine cycle.

Referring now to block 64 of the figure. It will be noted that this block consists essentially of a Multiplexer which has four indicated inputs any one of which is selected by the op code via the Instruction Decoder. Thus for those instructions where the rotated data is to be inserted into the prior contents of the register RA, the (RA) input to the Multiplexer would be activated.

For those instructions where the rotated data is to be merged with the former contents of the MQ register, that particular input of the Multiplexer would be selected. In those operations (certain shift algebraic ops) where the status of the '0' bit of the RS register determines whether a field of '1's or '0's is to be the object operand of the Insert/Merge operation, the RS '0' input to Multiplexer 64 is energized.

Finally, for those operations where the rotated word is to be merged with a word consisting of all '0's, the '0's input to the Multiplexer 64 would be activated by the Instruction Decoder.

The Insert/Merge block 66, as will be apparent, is a three-input logic circuit which allows the bit configuration from cable 82 to appear in the output in all bit positions where the mask is a '1' and the bit configuration on cable 84 to appear in the output in those bit positions where the Mask contains '0's. As will be apparent, this function could be performed by a 32 element Multiplexer having two inputs, i.e., cables 82 and 84 and wherein the selection is done on a bit basis under control of the Mask. This circuit could obviously take other forms. The register R2 accepts the output at the Insert/Merge block 66 and in the majority of operations the results would be sent back to General Purpose register RA.

The circuitry disclosed in FIG. 3 is capable of performing any of the instructions specified previously and generally referred to herein as Mask and Rotate instructions. The specific fields which would be utilized in performing any given instructions are rigorously set forth and described in the preceding definition and format section. In order to facilitate an understanding of the operation of the circuit the following examples of the three basic classes of instructions will be set forth for illustrative purposes.

The first instruction which will be specifically (as) described will be one of the Rotate instructions with Mask. A typical instruction in this group would be 'Rotate Immediate then Mask Insert, M-form'. The specific details of this instruction have been set forth previously. It is to be noted that the control fields provided in the instruction are the op code which will define the details of the function to be performed and the source of various parameters as described previously, the RS field, the RA field, the SH field and the MASK. This particular instruction specifies that a given field (specifed by SH) within the data stored in Register RS is to be inserted into the word currently stored in Register RA within a field therein which is defined by the Mask.

This is accomplished as follows. General Purpose Register RS is accessed and gated directly into the Rotator 60. Substantially concurrently therewith the SH field is accessed from the Instruction Register and similarly gated into the Rotator 60 over cable 61. An appropriate shifting operation ensuer. Substantially parallel therewith the Mask is generated utilizing 11 bits from the MASK field in the Instruction Register. Bit 21, as will be remembered, is the Mask Definition Bit (MDB) which specifies the nature of the Mask. Bits 22 through 31 are the 5 bits for the Left Edge and Right Edge determination. These are gated through the Multiplexers 70 into the Mask Generation unit 62. The third operation which occurs substantially in parallel with the previous operations is the accessing of the General Purpose Register RA whose content (RA) is gated into the Multiplexer 64 over the indicated cable. At this point the three operands comprising the contents of Register RA, the output of the Rotator 60 and the Mask from the Mask Generation unit 62 are inputs to the Insert/Merge unit 66. The output from this unit is temporarily stored in Register R2 and subsequently returned to General Purpose Register RA.

A typical instruction in the general class of Shift Instructions is the 'Shift Left Instruction' similarly set forth in detail previously. In this instruction the active fields are the basic op code and also the extended op code which indicates to the Instruction Decoder just what operations must be performed, the RS field which defines the subject of the Shift, the RA field which defines the General Purpose Register into which the subject word is to be shifted, and the RB field, which in bit positions 27 through 31, of the Register specifies the shift magnitude.

The way in which this operation is performed in the present circuitry is as follows. The data stored in Register RS is gated into the Rotator 60 and the shift magnitude stored in Register RB is gated via Multiplexer 36 into the Rotator over cable 61. This quantity is also available for mask generation on a cable forming one of the inputs to the Multiplexers 70 of the Mask Generation Unit 62. Which of the two Multiplexers is activated is determined from the op code. Assuming that the op code will call for the Mask to be generated by the Left Edge circuit, the shift magnitude field would cause a two-part Mask to be produced by the Mask Generation Unit. Concurrently with these operations, the contents of Register RA are selected by Multiplexer 64 so that, again three inputs are available to the Insert/Merge block 66. These are the contents of Register RA, the output of Rotator 60 which comprises the former contents of Register RS shifted the specified number of bits and finally the Mask from Mask Generation Unit 62. This allows the contents of RS to essentially be rotated into Register RA a specified number of bit positions. The results of this operation are then returned via Register R2 to the General Purpose Registers at location RA.

It should be noted in passing that in the general category of described Shift Instructions any of the four inputs to the Multiplexer 64 may appear on cable 84 and thus be the object operand of the Insert/Merge operation. Stated differently, it is the word into which the specified portion of the object operand on cable 82 is to be inserted.

The final instruction to be described is one of the Rotate and Store instructions set forth in detail previously. It will be remembered that these instructions are actually used to effect the movement of data in the main storage and accordingly do not require the setting of any condition codes since these are not performing CPU tasks per se. Similarly, a number of the operations required of the Instruction such as the generation and use of ADDRESS BITS RA+4 and the MARK BITS require data generation and apply to the Memory controls and not to the present Mask and Rotate operation. However, these instructions are indicative of the type of system function which can be achieved utilizing the present Mask and Rotate hardware mechanism.

The 'Rotate Right and Store Update' Instruction is typical of this class of Instructions and provides the following active fields. The op code and extended op code are contained in bits 0 through 5 and 21 through 31 as described previously. This op code will control the sequential operation of the circuitry of FIG. 3 as with all of the other instructions. Fields RS, RA and RB are provided for accomplishing the following operations. The contents of Register RS are gated into the Rotator 60. The shift magnitude is determined from bits 27 to 31 of the data stored in General Purpose Register RB. This field is simultaneously gated to the Rotator over cable 61 and to either the Left Edge or Right Edge Multiplexers 70 under control of the Instruction Decoder. The rotated word is stored in the MQ Register. However, at this point it should be noted that the former contents of the MQ register must be retained in an auxilliary register for the subsequent Insert/Merge operation. Parallel with the shifting operation in Rotator 60 the Mask is generated under control of the Shift Magnitude field as just described. The rotated word emanating from Rotator 60 enters the Insert/Merge block over cable 82 concurrently with the former contents of MQ Register over cable 84 and the Mask via cable 86. The output of the Insert/Merge operation is stored in the Register R2. However, instead of being stored back into Register RA it is stored back into Register RA+4 via address generating circuitry operable under control of the Instruction Decoder which, however, forms no part of the present invention. Concurrently the updated address RA+4 is itself stored in general register RA.

It is noted in passing that the Rotate and Store Instructions are used in various combinations to move long strings of data and realign the data within main memory. They utilize the facilities of the present Mask (in) and Rotate logic unit.

It is also noted in passing that the use and interpretation, as well as the storing, of the marks as a result of certain of the Rotate and Store instructions forms no part of the present invention. These particular marks are generated, stored and utilized by the system memory controls as indicated in the definitions accompanying these particular instructions in the previous description.

The preceding description of the three specific instructions illustrating the operation of the present Mask and Rotate unit is not intended to be exhaustive. However, it clearly indicates the way in which the present mechanism functions. It is believed that any person skilled in the art could analyze any of the instructions set forth and readily determine the way the hardware of FIG. 3 would function to perform the particular instruction.

While the invention has been set forth and described with respect to the herein disclosed preferred embodiment thereof, it will be readily appreciated by those skilled in the art, that many changes may be made in the form and detail of both the instructions and in certain hardware details which might alter certain internal operating sequences without departing from the spirit and scope of the present invention as set forth in the appended claims.

Having thus described out invention, what we claim as new, and desire to secure by Letters Patent is:

1. In a digital electronic computing system having a single machine cycle executable instruction set and including a memory hiearcrchy comprising a main memory and a high-speed cache, a Central Processing Unit (CPU) and a bus network interconnecting same, said CPU including an arithmetic and logic unit (ALU) for performing mathematical and logical operations on data supplied thereto, an instruction unit operable in cooperation with a plurality of simultaneously accessible high speed general purpose registers and said ALU for processing primitive instructions to be performed by said system, and condition code generating means for generating a plurality of specified condition bits in accordance with the output of the ALU and the instruction unit, the improvement which comprises, a mechanism including a plurality of concurrently operable means for performing single machine cycle executable Mask and Rotate Instructions in said CPU wherein a subject operand is to be partially merged with an object operand under control of a mask, all of which are specified in one of said instructions, said mechanism comprising:

means for generating an N-bit mask word from mask edge addresses specified by mask field in the instruction, access means for obtaining an N-bit subject operand from data specified in said instruction, access means for obtaining one of a plurality of possible N-bit object operands from the system high speed registers from data specified in said instruction, shifter means for rotating said N-bit subject operand which is to be merged with an N-bit object operand by an amount specified in said instruction, combinatorial circuit means for merging said rotated subject operand into said object operand under control of said mask so that data representative of the object operand is retained where said mask has a first binary content and data representative of the rotated subject operand is retained where said mask has the opposite binary content, and means for returning said retained merged N-bit word to a register in the CPU specified by said instructions.

2. A mechanism for performing mask and rotate instructions as set forth in claim 1 including means for concurrently accessing all required operands in said general purpose registers and in the instruction register.

3. A mechanism for performing Mask and Rotate instructions as set forth in claim 2 wherein said means for generating said N-bit mask includes means for generating a three-part mask comprising strings of 0's surrounding at least a single "1" or the inverse, said means including,
    means for accessing a pair of mask edge addresses directly specified in a 'mask' field in said instruction which addresses specify the location and extent of the central portion of said Mask, and
    means for decoding each of said mask edge addresses and supplying said decoded information to Mask generating circuitry.

4. A mechanism for performing Mask and Rotate instructions as set forth in claim 2 wherein said mask generating means comprises means for generating a two-part mask comprising a string of '0's followed by a string of at least a single '1's of its inverse, said means further including,
    means for obtaining a single mask edge address from a 'mask' field in said instruction, decoding said mask edge address into an address specifying the location in the mask where there is to be a binary transition and supplying said decoded address to a Mask Generating Logic circuit which produces the required mask.

5. A mechanism for performing Mask and Rotate instructions as set forth in claim 2 wherein said means for obtaining the object operand includes,
    gating means for selectively accessing one of four possible inputs which comprise a specified general purpose register in the CPU, a working register (MQ) operatively associated with said ALU, an N-bit word consisting of all '0's, or an N-bit word consisting of all '1's or all '0's depending upon the condition of a sign bit stored in a specified general purpose register, and
    wherein said combinatorial circuit means comprises an N-bit, 3 input selection circuit which receives the object operand, the subject operand and the Mask as inputs.

6. A mechanism for performing single-cycle Mask and Rotate instructions as set forth in claim 5 including means for concurrently accessing said General Purpose Registers and the Instruction Register to supply all of the instruction parameters contained in the Instruction Register and the General Purpose Registers (substantially in parallel) to said mask generating, subject operand rotating and object operand obtaining means wherein a predetermined portion of the subject operand is to replace a predetermined portion of the object operand.

7. A method for use in a program controlled digital electronic computing system for performing a powerful class of Mask and Rotate instructions capable of performing a wide variety of data shifting functions, said functions including inserting a portion of a subject operand under control of an N-bit mask into a variety of different types of N-bit object operands, said method including the steps of
    accessing from the instruction an address in the system's local high speed storage registers of the subject operand, a portion of which is to be inserted into said object operand, generating said N-bit mask from a 'mask' filed in the instruction, which Mask defines the field of the subject operand to be inserted and also the specific field within the object operand where the subject operand is to be inserted,
    realigning the N-bit subject operand within its own N-bit space an amount necessary to align a particular field thereof with the filed of the object operand into which said subject field is to be inserted, and
    accessing the particular object operand specified by said instruction into which said subject operand is to be inserted.

8. A method for performing mask and rotate instructions as set forth in claim 7 including accessing an object operand which is directly obtainable from the content of a general purpose register or is generated from the content of the instruction register.

9. A method for performing mask and rotate instructions as set forth in claim 8 including prefetching and storing all data required by said instructions in the system general purpose registers whereby no memory operations are required to perform said operation.

10. A method for specifying mask and rotate instructions as set forth in claim 7 including performing rotate and store operations to realign a multi-word segment of data on different byte boundaries in the system memory which comprises utilizing a sequence of rotate and instructions to effect said data alignment further including;
    specifying as the new subject operand of a given rotate instruction the object operand of the preceding instruction, and
    returning the successive merged results as the appropriately rotated data string.

* * * * *